United States Patent [19]

Lageose

[11] Patent Number: 6,066,823
[45] Date of Patent: May 23, 2000

[54] SEMIAUTOMATIC TUBE WELDING APPARATUS

[76] Inventor: Michael M. Lageose, 1418 N. 72 East Ave., Tulsa, Okla. 74115

[21] Appl. No.: 09/153,740

[22] Filed: Sep. 15, 1998

[51] Int. Cl.[7] ................................................ B23K 9/02
[52] U.S. Cl. ..................... 219/60.2; 219/60 R; 219/59.1; 219/61; 219/60 A; 219/50; 219/125.1; 219/125.11; 228/29
[58] Field of Search ............................ 219/60.2, 60 R, 219/59.1, 61, 60 A, 50, 125.1, 125.11; 228/29

[56] References Cited

U.S. PATENT DOCUMENTS

| | | | |
|---|---|---|---|
| 3,428,777 | 2/1969 | Certain | 219/125 |
| 3,621,177 | 11/1971 | McPherson et al. | 219/61 |
| 3,754,114 | 8/1973 | Peyrot | 219/125 R |
| 3,769,489 | 10/1973 | Charlesworth | 219/125 R |
| 3,940,586 | 2/1976 | Stearns et al. | 219/75 |
| 4,109,131 | 8/1978 | Schluter | 219/137.62 |
| 4,357,515 | 11/1982 | Kiefer et al. | 219/60.2 |
| 5,221,818 | 6/1993 | Jusionis et al. | 219/61 |
| 5,285,042 | 2/1994 | Erichsen | 219/75 |
| 5,481,079 | 1/1996 | Erichsen et al. | 219/75 |

OTHER PUBLICATIONS

Minnick, *Gas Tungsten Arc Welding Handbook*. The Goodheart–Willcox Company, Inc., South Holland, IL, 1996, pp. 5–11; 39–70.

Weisman, Editor, *Welding Handbook, Fundamentals of Welding*. Seventh Edition, vol. 1. American Welding Society, Miami, FL, 1976, pp. 2–32.

*Primary Examiner*—Patrick Ryan
*Assistant Examiner*—M. Alexandra Elve
*Attorney, Agent, or Firm*—Fellers, Snider, Blankenship, Bailey & Tippens, P.C.

[57] ABSTRACT

The present invention relates generally to an apparatus and method for performing tube-to-tubesheet welding within box headers and, in more particular, to a GTAW welding gun that has a long generally tubular barrel which is small enough in diameter to pass through the plug holes on one side of a box header and long enough to reach over to the point of connection on the opposite tubesheet. Additionally, and as a critical part of the instant invention, the torch is fitted with a semi-automatic cold wire feeding apparatus and an associated wire feed liner that is constrained to be proximate to the exterior of that tube throughout said barrel's length. Thus, both the barrel of the welding torch and its accompanying wire feed liner are sized to fit within and pass through a plug hole.

9 Claims, 3 Drawing Sheets

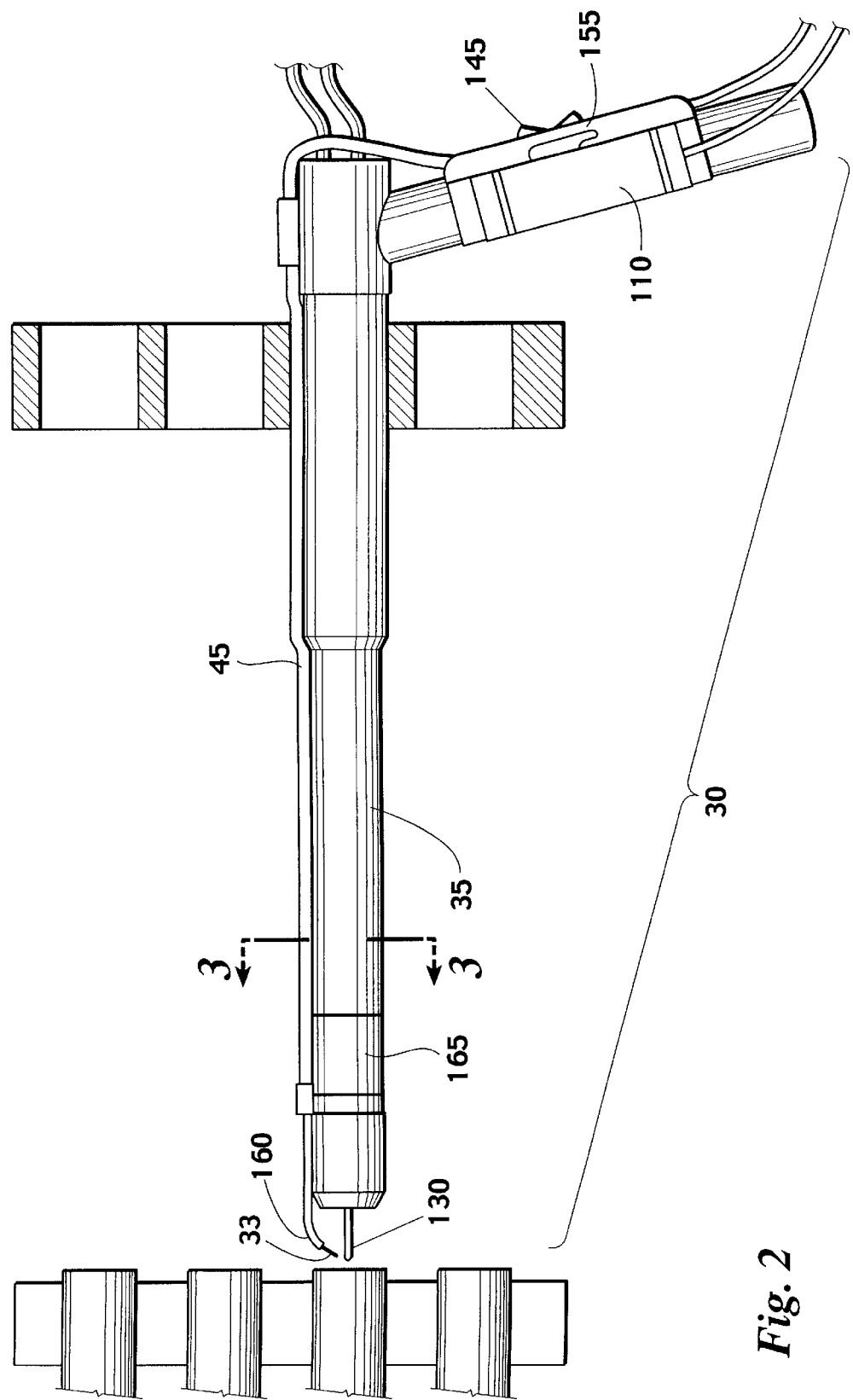

SEMIAUTOMATIC TUBE WELDING APPARATUS

FIELD OF THE INVENTION

The present invention relates generally to an apparatus for the weld-joining of metal tubing. In more particular, the invention disclosed herein relates to a torch apparatus for use in tube-to-tube-sheet or box header welding and to cold wire feed semiautomatic tube welding within a box header.

BACKGROUND

The term "arc welding" applies to a large and diversified collection of welding processes that use an electric arc as the source of heat to melt and join metals. The arc is struck between the workpiece and an electrode that is manually or mechanically moved along the joint, or that remains stationary while the workpiece is moved underneath it. The electrode will either be a consumable wire or rod, or a nonconsumable rod made of, for example, carbon or tungsten which carries the current and sustains the electric arc between its tip and the workpiece. When a nonconsumable electrode is used, a separate rod or wire can supply filler metal if needed.

Of particular importance for purposes of the instant invention, the gas-tungsten arc welding process ("GTAW," hereinafter, or alternatively, "TIG" welding as it is sometimes called) uses a nonconsumable tungsten electrode for one pole of the arc. The tungsten electrode, and the weld zone (i.e., the area being welded) are shielded from the atmosphere by an inert gas, such as argon or helium, which gas acts to reduce oxidation of the electrode. The heat necessary for fusion (mixing or combining of the molten metals) is provided by an arcing electric current between the tungsten electrode and the base metal. The arc fuses the metal being welded as well as filler metal if it is used. The gas shield protects the electrode and weld pool and provides the required arc characteristics. This type of welding is usually done with a single electrode. However, it may alternatively be done with several electrodes.

The GTAW process may employ either direct current (DC) or alternating current (AC), DC straight polarity current being generally preferred for most applications. Regardless of current type, a constant current welding supply is required. In addition, a high frequency oscillator is usually an integral part of the power supplies intended for GTAW. High frequency can be employed with DC to initiate the arc instead of touch starting so as to minimize tungsten electrode contamination. It is therefore normally turned off automatically after arc ignition. High frequency is employed with AC for initiating the arc and to insure its re-ignition at each half cycle while welding.

The basic equipment needed for GTAW welding consists of a welding torch, welding power supply, and a source of inert gas with suitable pressure regulators and flowmeters. Electric power requirements depend upon the thickness to be welded and range from 8 kW for a 200 amp DC unit to 30 kW for a 500 amp AC balanced wave unit. Portable engine driven power supplies are available, as well as are standard line voltage units.

Cold wire feeders are used in manual, semiautomatic and fully automatic operations where filler wire application is required. They are adaptable to both hard (steels, stainless steel, etc.) and soft (aluminum, magnesium, etc.) wires. Various types of drive mechanisms and guides can be used to adapt the units to different diameters of filler wire.

Box header welding, or tube-to-tube sheet welding as it is also called, presents certain logistical problems which are not present in general welding applications, tube-to-tube welding being commonly necessary during the construction of heat exchangers, boilers, and condensers. In this application, several tubular members are affixed to a flat sheet with holes therein which forms one face of a "box". The tubular members are aligned so that they extend perpendicularly from the face of the box and mate with one of the tube holes in that face. The opposite face of the box contains an equal number of threaded and tapped access holes or "plug holes" passing therethrough. As the name suggests, after the tubes are affixed to the box header, plugs are installed in these holes and the unit is then pressurized to test the integrity of joint between the tubular members and the flat sheet. The tubes and the material to which they are welded might be made of almost any sort of combinations of metals.

Of particular importance for purposes of the instant invention is the difficulty in performing the weld in question when it must be done inside of the boxheader. The preferred way of doing this is to insert a welding apparatus through an opposing plug hole and over to the opposite side where the weld is performed. For example, Kiefer et al., U.S. Pat. No. 4,357,515, teaches a complex welding torch made of a high temperature plastic which contains, among other things, a fiber optic bundle that allows video display of the welding process. Jusionis et al., U.S. Pat. No. 5,221,818, discloses a box header welding apparatus that contains a rotating mandrel and a centering mechanism that helps to assure proper radial alignment of the welding torch with respect to the tube. Both of these inventions, however, are complex pieces of equipment that are not capable of moving from hole-to-hole very quickly, which results in increased time and cost to perform a job. Additionally, inventions of this type tend to limit the movability and accessibility of the torch within the box header such that a skilled welder, given the proper tool, can in most cases do the job better and faster.

Other popular general approaches to box header welding that have been used in the past include stick welding (i.e., shielded metal arc welding) and fusion methods (e.g., roll expanding or automatic fusion methods). However, these approaches have proven to be less than satisfactory in practice, as the joints have tended to develop leaks over the long term, and this is especially true in the case of fusion methods. Additionally, customers are demanding with increasing frequency the use of strength welds, which generally eliminates fusion joining methods from consideration.

Thus, what is needed is an apparatus for tube to tubesheet welding that overcomes the disadvantages of the prior art and provides skilled craftsmen with an effective way to perform tube-to-tubesheet welding within the confines of a box header. Accordingly, it should now be recognized, as was recognized by the present inventor, that there exists, and has existed for some time, a very real need for a tube-to-tubesheet welding system that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The present invention relates generally to an apparatus and method for performing tube-to-tubesheet welding within box headers. Broadly speaking the instant invention involves the use of a GTAW welding gun that has a long generally-cylindrical tubular barrel, which barrel which is small enough in diameter to pass through the plug holes on one side of a box header and long enough to reach over to the tube holes on the opposite tubesheet. Additionally, and as a critical part of the instant invention, the torch is fitted with a semi-automatic cold wire feeding apparatus and an associated wire feed liner that is constrained to be proximate to the exterior of that tube throughout said barrel's length. Thus, both the barrel of the welding torch and its accompanying wire feed liner are of a small enough diameter to fit within and pass through a plug hole.

In the preferred mode of operation, the instant invention is designed to be of a lesser diameter than the plug holes on the opposite side of the box header from the tube holes. Then, the barrel—including its externally attached cold wire feed liner—is inserted into an access hole and across the intervening space inside the box header. A button on the handle of the torch is manually activated and wire is fed through the wire feed liner for delivery to the end of the torch. The wire is advanced to be melted by the electrode and deposited on the surface of the tubesheet, thereby welding together the two members. The torch barrel is then withdrawn from that hole, and inserted into another plug hole and the process is repeated.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

FIG. 2 illustrates the instant invention in greater detail and additionally shows how the invention is preferably used in practice.

DETAILED DESCRIPTION OF THE PREFERRED EMBODIMENT

According to a preferred embodiment of the instant invention, there is provided a welding torch for use in welding box headers, wherein the barrel of the torch and a wire feed liner that is attached thereto throughout its length are sized in diameter so as to fit through a plug hole and long enough to reach through to the opposite header block or tube sheet on the opposite side.

Figure 1:
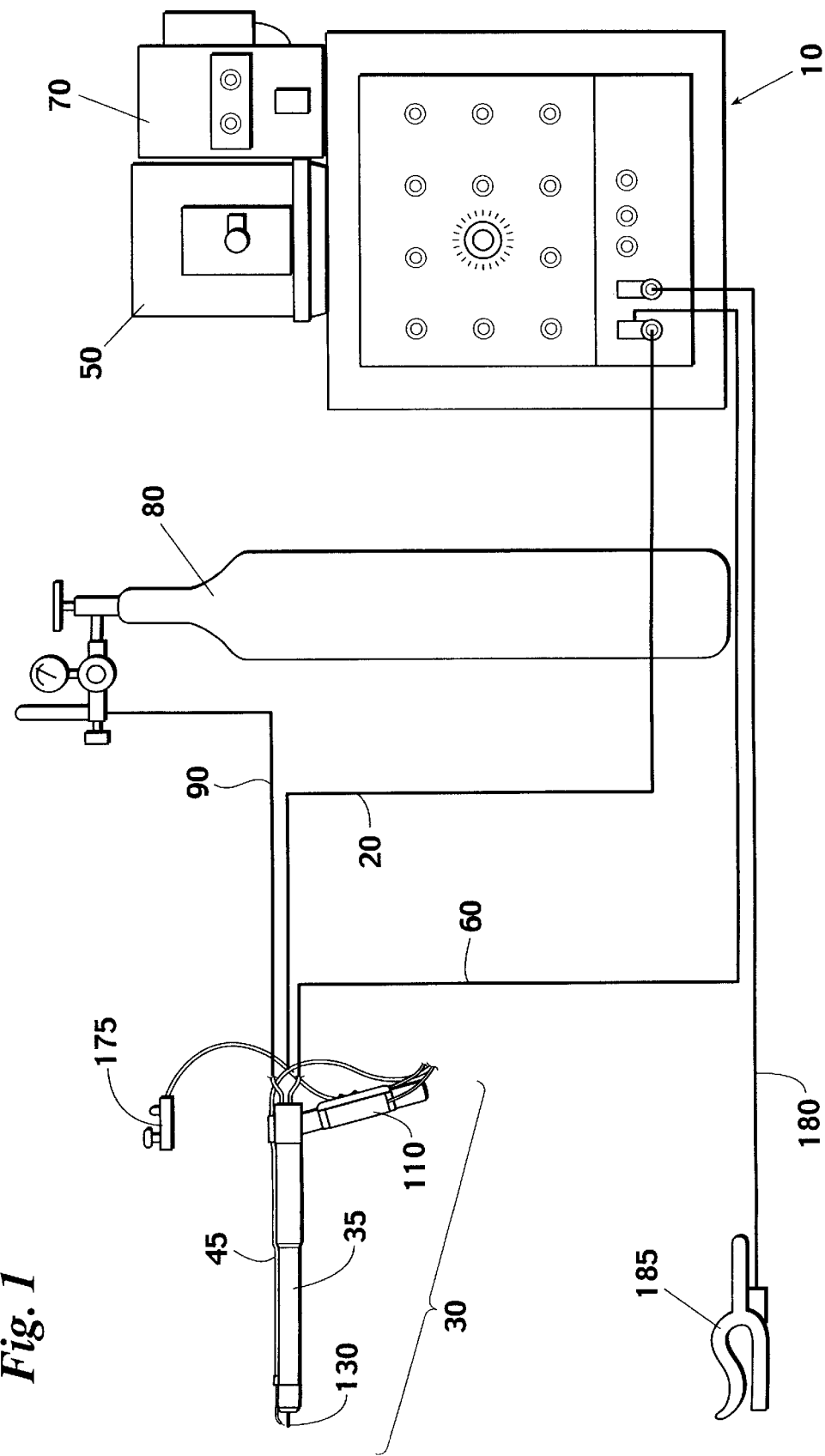
FIG. 1 illustrates the instant invention together with its preferred supporting hardware.
Figure 3:
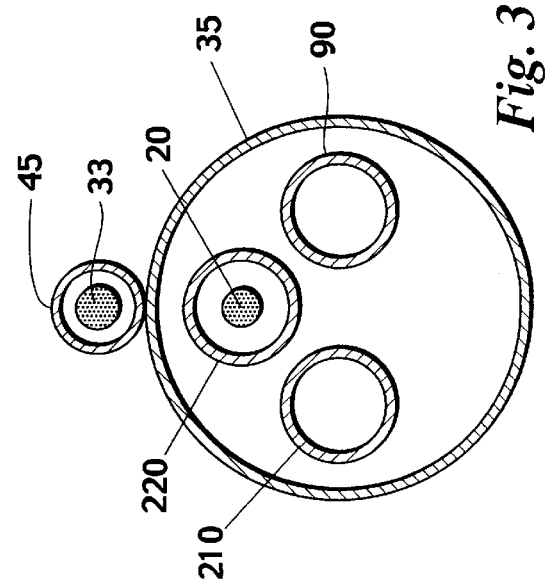
FIG. 3 is a cross-sectional view of the barrel along the line 3—3 in FIG. 2.

Broadly speaking and as is illustrated in FIG. 1, the equipment with which the instant invention is preferably used is as follows. A weld power source 10 provides an electrical current through power cable 20 to welding torch 30, the electrical current being used to generate an electrical arc between electrode 40 of the torch 30 and the workpiece, i.e., the surface being welded. Work lead 185, which is connected by way of return line 180 to the power source, is attached to the workpiece to complete the electrical circuit in a manner well known to those skilled in the art. Circulating coolant from cooler 50 is used to lower the temperature of the barrel 35 of the torch 30 during operations and is delivered and withdrawn by way of coolant line 60, the preferable coolant for most purposes being an antifreeze-like mixture of water and ethylene glycol. Wire feeder 70 pushes wire weld material 33 to the torch 30 through a wire feed liner 45, a conduit, or similar enclosed means. (See FIG. 3. This arrangement is known generally in the trade as a "cold wire feeding system.") In the preferred embodiment, the wire feeder 70 may be started and stopped at the direction of the welder (i.e., a semi-automatic welding method) through the use of wire feed switch 145 which is preferably mounted on the handel 110 of the torch 30. (Alternatively or additionally and as illustrated in FIG. 1, this switch might take the form of a foot switch 148). Finally, gas supply 80 contains an inert gas (usually helium or argon) which is passed through inert gas line 90 to the welding torch 30 and acts to shield the arc against contact with the atmosphere and to reduce oxidation of the electrode 130. The electrode 130 is preferably made of a nonconsumable material such as tungsten.

As is illustrated more fully in FIG. 2, the torch 30 consists of an elongate substantially cylindrical barrel 35—of diameter less a plug hole diameter and of length commensurate with distance between the tube hole sheet and the plug hole sheet. The barrel 35 is kept cool by circulating a liquid coolant from cooler 50 through a pair of coolant conduits (210 and 220, FIG. 3), one of which conveys coolant toward the tip of the torch 30 and the other of which conveys coolant back to the cooler 50. The coolant conduits 210 and 220 together will be collectively referred to hereinafter as a water jacket. In the preferred embodiment, water line 220 carries coolant toward the tip of the barrel 35 and return water line 210 provides a return path to the cooler 50, with the two coolant lines being jointed near the tip of the barrel 35 by, for example, a simple "U" connection. Additionally, in the preferred embodiment, power line 20 is placed within water line 220 within the barrel 35, thereby providing cooling directly to this element. Needless to say, the dimensions of the water jacket, gas line 90, and wire line feeder 45 must be kept as small as possible under the circumstances, so that the overall diameter of the assembled torch barrel 35 can be kept to a minimum.

The barrel 35 might potentially be of any length, but the instant inventor has designed torches that have barrels that are as long as 22 inches and as short as 4 inches, depending on the needs of the particular application. Of course, as the barrel length increases, the amount of play at the end of the barrel 35 where the electrode 130 is placed also increases, a factor which tends to make the longer torches 30 more difficult to use. Thus, the preferred torch barrel 35 length is intermediate between 22 and 4 inches, with shorter lengths being generally preferred over longer ones.

In the preferred embodiment and as is illustrated in FIG. 2, the handle 110 is preferably angled away from the electrode 130 end of the barrel 35, thereby making it possible for the welder to extend the unit deeper into the interior of the box header. In the preferred embodiment, the handle 110 will make an inside angle of about 135 degrees with the barrel 100, where the term "inside angle" is used to mean the angle between the handle 110 and the barrel 35 as measured on the electrode 130 side of the handle 110 (i.e., the handle 110 makes an angle of about 45° (counter clockwise) with respect to the vertical in FIG. 2 or an angle of about 135° with the barrel 35).

A two-button control arrangement 140 allows the operator to regulate the weld power source 10 and the wire feeder 70 with a single hand. As is generally illustrated in FIG. 2, a slide switch 155 preferably regulates the amperage of the weld power source 10 and the wire feeder 70 is controlled by rocker switch 145, although other arrangements are certainly possible. Additionally and as is generally indicated in FIG. 1, the amperage switch is often placed on a foot switch 175, depending on the personal preferences of the welder. The welding wire 33 is pushed by the wire feeder 70 out of the end of the wire feed liner 45 where it is turned downward and placed in proximity to the tungsten electrode 130 by means of wire feed tip 160. Liner positioning clip 165 helps to keep the wire feed liner 45 proximate to the barrel and additionally provides a means of mounting the wire feed tip 160.

It is critical to the practice of the instant invention that the wire feed liner 45 be proximate to the exterior of the barrel 35 throughout the length of the barrel 35. By keeping these two items close together, the overall diameter of the barrel 35/wire feed liner 45 assembly/water jacket combination can be made small enough to pass though the typical plug hole, which might be as small as, for example, five-eights of an inch in diameter—a diameter which is much too small for conventional torches to pass through. Additionally, the barrel 35 may optionally be made of a flexible material to allow it—and the wire feed liner 45—to be bent at an angle when the situation calls for it. Typically, the barrel 35 will be made of copper covered with a non-conductive coating such as rubber. Additionally, voids in the interior of the barrel 35 are usually filled with a heat resistant rubber material.

In operation and as is generally illustrated in FIG. 2, the barrel 35 of the welding torch 30 of the instant invention is inserted through a plug hole on one side of the header block and moved forward and across the span of the box header until the electrode 130 is proximate to the tube sheet where the welding is to take place. Once the torch 30 is in position, the operator will activate the switch 155 that controls the remote weld power source, thereby supplying current to the electrode 130. Then, the wire feeder is activated by way of switch 145, which advances the weld material through the wire feed liner 45 to the point where it can be melted by the electrode 130.

Figure 4:
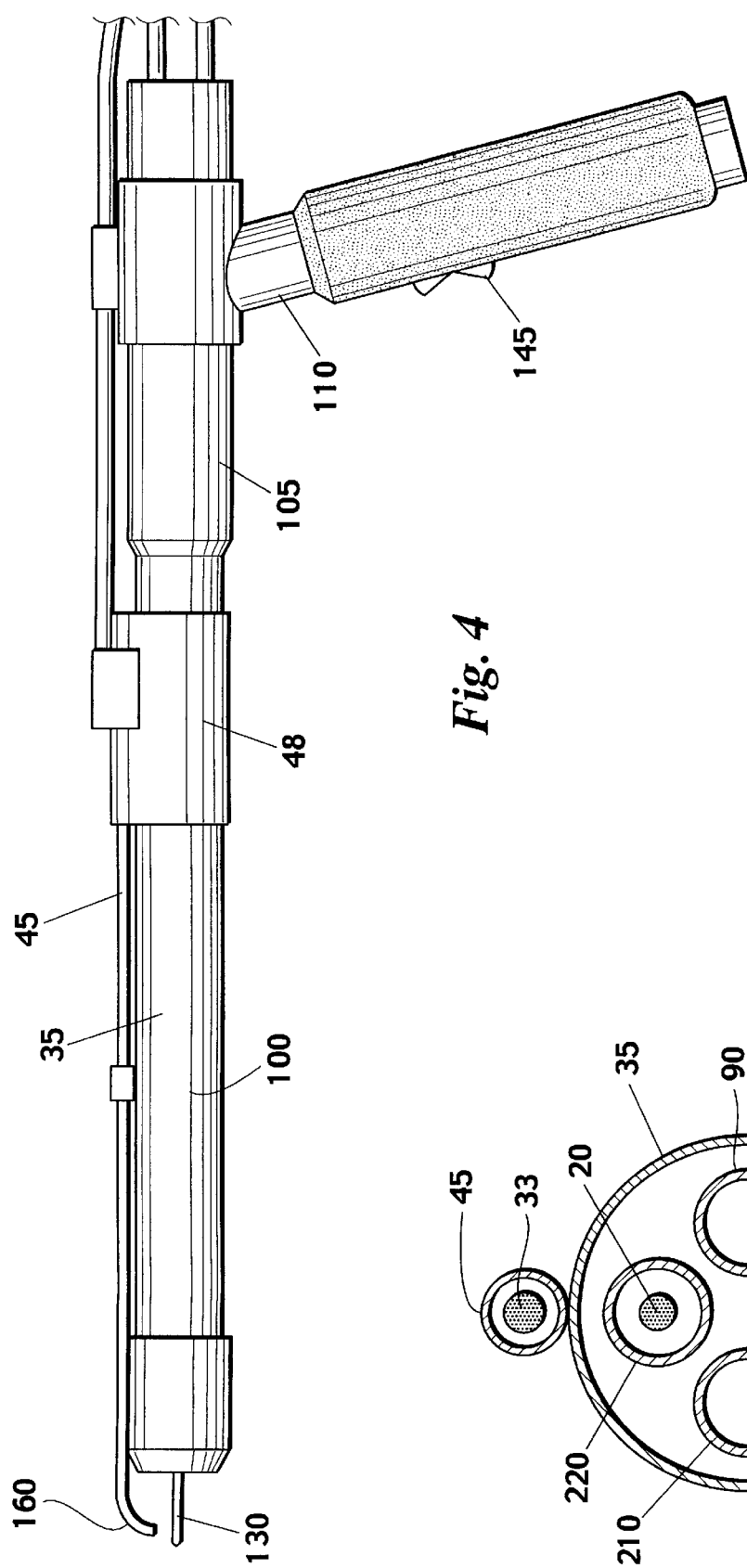
FIG. 4 shows another embodiment of the instant invention.

According to another aspect of the instant invention—and as is generally pictured in FIG. 4—there is provided a welding torch substantially as described above, but wherein the barrel 35 is formed of two pieces, rather than being constructed of a single piece of tubing. The embodiment of FIG. 4 illustrates one such way of doing this. Cylindrical elements 100 and 105 are joined together by a swage coupler 48, a swage coupler being well know to those skilled in the art as a means of connecting two cylindrical parts. As before, the interior of the combined elements 100 and 105 is still available as a pathway for electrical power, coolant, and argon gas to be conducted to the tip of the barrel 35. Those skilled in the art will realize that this is just one way of constructing a two-element barrel and other arrangements are certainly possible. In the text that follows, the term "barrel" will be used to refer to, not only a conventional single-piece barrel, but also a torch barrel that built from multiple cylindrical segments.

The instant invention—because of its maneuverability and flexibility—is appropriate for use with any tube-to-tubesheet weld joint design that might be specified by a welding engineer, including, by way of example, external fillet, cap, land, internal filet, internal bore, etc. It's usefulness for welding within a box-header is limited only by the skill and ingenuity of the welder.

In summary, the instant invention is designed to allow a welder to rapidly perform tube-to-tubesheet welding within the confines of a typical box header arrangement Because of the unique configuration of the barrel 35 and the wire feed liner 45, the torch 30 can be sized to allow the welder to use the instant invention inside of box headers that other tools cannot reach. Additionally, the simplicity of this device allows the welder greater flexibility in angling the device within the box header, thereby enabling welds to be made that are otherwise not possible in that environment.

While the inventive device has been described and illustrated herein by reference to certain preferred embodiments in relation to the drawings attached hereto, various changes and further modifications, apart from those shown or suggested herein, may be made therein by those skilled in the art, without departing from the scope and spirit of the instant inventive concept. It is understood that the invention is not limited to the embodiments set forth herein for purposes of exemplification, but is to be limited only by the scope of the attached claim or claims, including the full range of equivalency to which each element thereof is entitled.

What is claimed is:

1. A welding torch for use in tube to tubesheet welding, wherein is provided a box header having an interior bounded by at least a first wall and a second wall, said first wall containing a plurality of plug holes therethrough, and said second wall being opposite said first wall and parallel thereto, and containing a corresponding plurality of tube holes, comprising:

(a) an elongate substantially cylindrical barrel having
an exterior surface and an interior,
a diameter and a length, and,
a forward terminus and a reward terminus,
said barrel length being longer than a distance between said first wall and said second wall;

(b) a water jacket for cooling said barrel during operations, said water jacket being positionable within said barrel interior;

(c) an electrode mounted proximate to said forward terminus of said barrel for melting a weld metal, said electrode being electrically connectable to a weld power source;

(d) a wire feed liner for guiding the weld metal to said electrode, said wire feed liner
having a diameter,
being mountable externally to said barrel, and
being proximate to and substantially parallel to said barrel exterior surface along substantially the entire length of said barrel,
wherein said barrel diameter and said wire feed liner diameter taken together are less than a diameter of at least one of said plug holes; and, (e) a handle positionable for supporting said barrel near said barrel rearward terminus.

2. An apparatus according to claim 1, wherein said handle is angled away from said barrel forward terminus and makes an inside angle of about 135 degrees with said barrel.

3. An apparatus according to claim 1, wherein said weld metal is advanced through said wire feed liner, and further comprising:

(e) a wire feed switch controlling the advance of the weld material; and, (f) a power switch controlling said weld power source.

4. An apparatus according to claim 3 wherein said wire feed switch and said power switch are both mountable on said handle.

5. An apparatus according to claim 1 further comprising:
(e) a coolant line positionable within said barrel for cooling said welding torch,
said coolant line carrying a coolant from a cooler to barrel, and
(f) a return line positionable within said barrel and in fluid communication with said coolant line, said return carrying coolant back to said cooler.

6. An apparatus according to claim 5 further comprising:
(g) an electrical power line positionable within said coolant line, said electrical power line providing an electrical connection between said electrode and a weld power source.

7. A method of constructing a tube to tubesheet welding torch for use with a box header having an interior bounded by at least a first wall and a second opposing wall, said first wall containing a plurality of tube holes therethrough, and said second wall containing a corresponding plurality of plug holes, comprising:
(a) acquiring an elongated substantially cylindrical barrel, said barrel having
an exterior surface and an interior,
a diameter and a length, said length being at least a long as a distance between the first and the second box header walls, and,
a forward terminus and a reward terminus,
(b) affixing an electrode proximate to said forward terminus of said barrel,
said electrode for melting weld metal when said electrode is placed into electrical contact with a weld power source;
(c) inserting a water jacket into said interior of said barrel, said water jacket for cooling said barrel during operations;
(d) affixing a wire feed liner to said barrel, said wire feed liner being proximate to and substantially parallel to said barrel exterior surface along substantially the entire length of said barrel; and,
(e) attaching a handle proximate to said reward terminus of said barrel.

8. A method of tube-to-tubesheet welding, wherein there is provided a box header having an interior bounded by at least a first wall and a second wall, said first wall containing a plurality of plug holes therethrough, and said second wall being opposite said first wall and containing a corresponding plurality of tube holes therethrough, and wherein is provided the apparatus of claim 1, comprising the steps of:
(a) selecting a tube hole and a corresponding plug hole;
(b) inserting said welding torch barrel into said selected corresponding plug hole until said electrode is proximate to said selected tube hole; and,
(c) initiating an electrical current through said electrode from said weld power source, thereby initiating a welding activity.

9. A method of tube-to-tubesheet welding, wherein there is provided a box header having an interior bounded by at least a first wall and a second wall, said first wall containing a plurality of plug holes therethrough, and said second wall being opposite said first wall and containing a corresponding plurality of tube holes therethrough, comprising the steps of:
(a) selecting a tube hole and a corresponding plug hole;
(b) simultaneously inserting into said selected tube hole
a welding torch barrel having
a forward end and a rearward end, said forward end having an electrode affixed thereto,
a water jacket within said welding torch barrel,
an inert gas line within said welding torch barrel,
a wire feed line, and
an electrical power line within said welding torch barrel, said electrical power line having one end in electrical communication with said electrode and another end in electrical communication with a weld power source,
until said electrode is proximate to said selected tube hole; and,
(c) sending an electrical current through said electrode from said weld power source, thereby initiating a welding activity.

* * * * *